United States Patent [19]

Friesen et al.

[11] Patent Number: 5,280,986
[45] Date of Patent: Jan. 25, 1994

[54] UTILITY VEHICLE CARGO BOX TAILGATE LATCH AND SUPPORT

[75] Inventors: Henry Friesen, Niagara Falls; Robert Creighton, Welland, both of Canada

[73] Assignee: Deere & Company, Moline, Ill.

[21] Appl. No.: 908,120

[22] Filed: Jul. 2, 1992

[51] Int. Cl.⁵ .................................... B62D 33/037
[52] U.S. Cl. ................................ 296/57.1; 292/278; 292/DIG. 29
[58] Field of Search ............ 296/51, 57.1, 58, 60, 296/61, 62; 292/DIG. 29, 271, 278

[56] References Cited

U.S. PATENT DOCUMENTS

| | | | |
|---|---|---|---|
| 525,633 | 9/1894 | Stewart et al. | 296/51 |
| 601,433 | 3/1898 | Cruxzan | 296/58 |
| 630,651 | 8/1899 | Brubaker | 296/60 |
| 684,900 | 10/1901 | Anderson | 296/60 |
| 906,019 | 12/1908 | Hennemann | 296/58 |
| 935,819 | 10/1909 | Reynolds | 296/57.1 |
| 1,270,026 | 6/1918 | Graebel et al. | 296/50 |
| 1,314,684 | 9/1919 | Manville | 296/60 |
| 1,588,493 | 6/1926 | Polson | 296/51 |
| 2,012,528 | 8/1935 | Cooper | 296/57.1 |

FOREIGN PATENT DOCUMENTS 139780  2/1949  Australia ........................ 296/60

OTHER PUBLICATIONS

Operator's Manual for AMT 626 All Material Transporter, Jul. 1990, cover page and pp. 20 and 21.
Kawasaki Sales Brochure, publication date unknown, unnumbered pp. 8, 9 and 16.

Primary Examiner—Dennis H. Pedder

[57] ABSTRACT

A tailgate for a utility hauling vehicle is alternatively held in either a closed position or a supported position by a pair of formed rods which are located at the opposite ends of the tailgate. When the rods are in latched positions, they are slightly flexed so as to create a bias which acts between the rods and the tailgate to maintain a rattle-free connection.

5 Claims, 2 Drawing Sheets

UTILITY VEHICLE CARGO BOX TAILGATE LATCH AND SUPPORT

BACKGROUND OF THE INVENTION

The present invention relates to utility hauling vehicles and more particularly relates to latches and supports for tailgates of cargo boxes of such vehicles.

Various hauling vehicle tailgate designs are known which include a cargo box having a tailgate forming a rear wall thereof and being mounted for pivoting about a horizontal axis at its bottom end between raised closed and lowered open positions. Typically a latch is provided at each upper corner of the tailgate for retaining the tailgate in its closed position and a flexible element, such as a cable, is provided which extends between each upper corner and the upper rear portion of each side wall of the box for retaining the tailgate in an open position wherein it forms a horizontal extension of the bed or floor of the box. These known tailgate latches and supports include many parts that make them relatively costly and somewhat complicated to assemble. Furthermore, in most cases the latch assemblies are not tight enough to keep the tailgate or latch assemblies from rattling when the vehicle is operated with the tailgate closed.

SUMMARY OF THE INVENTION

According to the present invention there is provided a cargo box with an improved tailgate latch and support assembly.

A broad object of the invention is to provide a cargo box having a tailgate latch and support assembly which overcomes the disadvantages of the prior art structures.

More specifically, it is an object of the invention to provide a tailgate latch and support assembly including a single member mounted between each end of the tailgate and an adjacent side wall and which functions both as a latch and support.

A further object of the invention is to provide a tailgate latch and support assembly at each end of the tailgate which includes a single member mounted such as to effect a biasing force which acts between the member and the tailgate so as to prevent them from rattling during operation of the vehicle.

These and other objects will become apparent from a reading of the ensuing description together with the appended drawings.

DESCRIPTION OF THE PREFERRED EMBODIMENT

Figure 1:
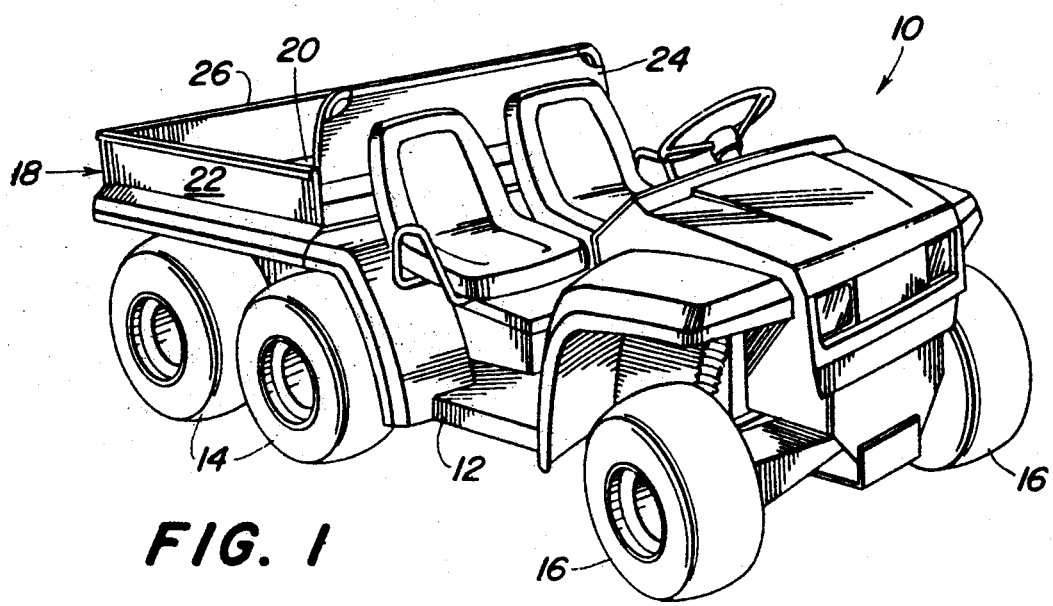
FIG. 1 is a right front perspective view of a utility hauling vehicle of the type with which the present invention is particularly adapted for use.

Referring now to FIG. 1, there is shown a utility hauling vehicle 10 including a frame 12 supported by four drive wheels 14 and a pair of steerable front wheels 16. Supported on the frame 12 in a location above the drive wheels 14 is a cargo box 18. The box 18 includes a horizontal bed or floor 20 and vertical right and left side walls 22 and a front wall 24. A tailgate 26 forms a rear wall of the box 18 and is mounted, in a manner to be described, for selectively closing the opening defined by the rear edges of the floor 20 the side walls 22.

Figure 2:
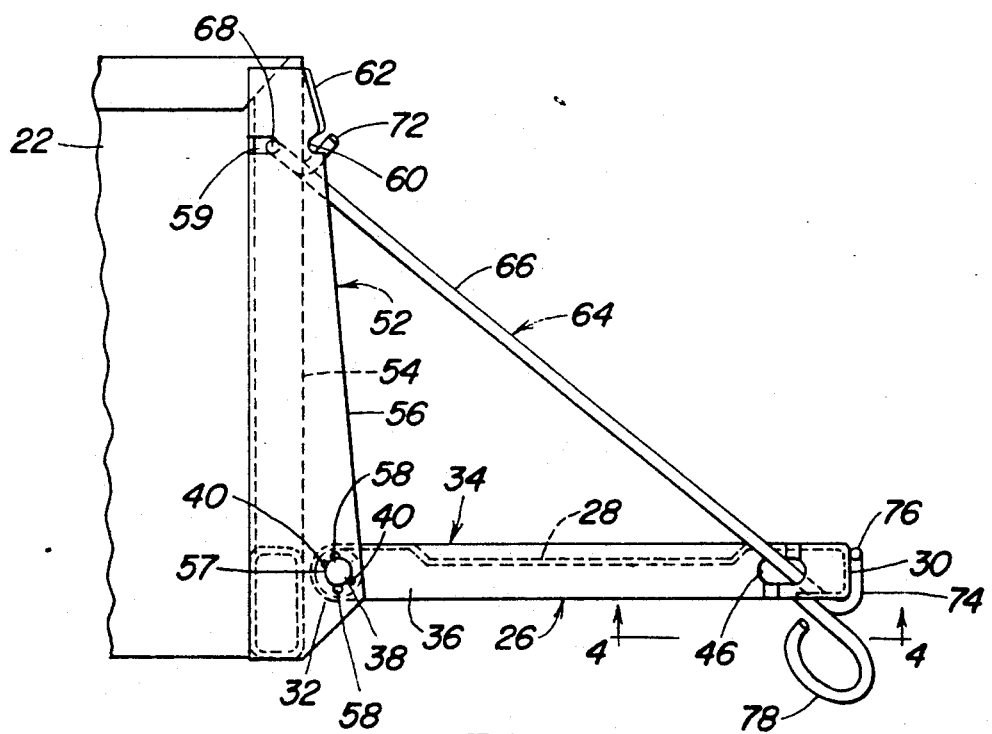
FIG. 2 is a left side elevational view showing the tailgate supported in its open position by the unitary latch and support member.
Figure 3:
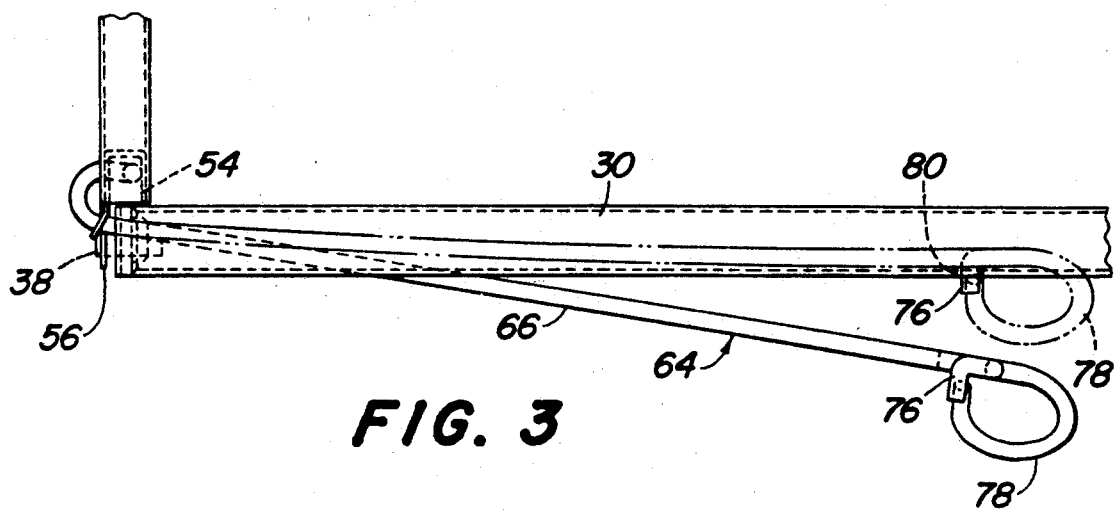
FIG. 3 is a top view showing the left corner area of the box showing the unitary latch and support member in solid lines in a position where it has just been unlatched or is about to be latched, and showing the member in dashed lines in its latched position.
Figure 4:
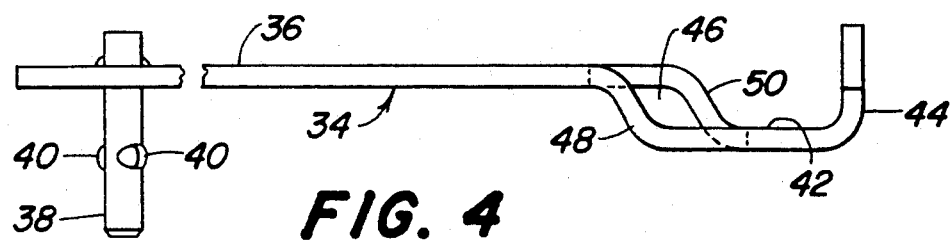
FIG. 4 is an enlarged view taken along line 4—4 of FIG. 2 but showing only the mounting bracket which forms one end of the tailgate.
Figure 5:
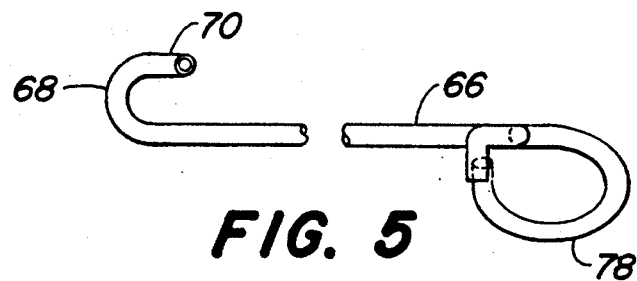
FIGS. 5, 6 and 7 are top, right end and rear views respectively of the unitary latch and support member shown in FIG. 3.
Figure 6:
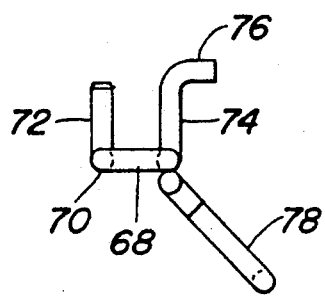
Figure 7:
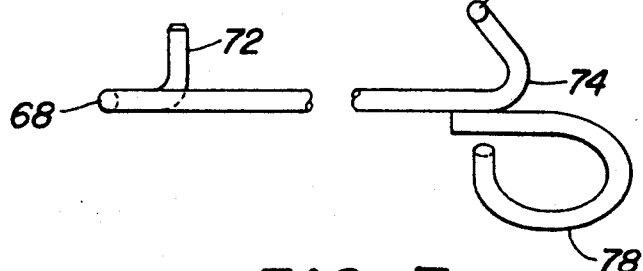

Referring now also to FIGS. 2-4, it can be seen that the tailgate 26, as considered in its upright closed position shown in FIGS. 1 and 3, includes an upright panel 28 having a rearwardly and downwardly bent or rolled upper end 30 that is substantially inverted J-shaped in cross section and having a rolled bottom end 32 that is substantially circular in cross section. Opposite ends of the tailgate 26 (only the left end being shown in detail) are each defined by a mounting bracket 34 in the form of a bent strap having a main straight portion 36 welded along a given end of the panel 28, including the tube-like bottom end 32, the straight portion having a hole receiving a pivot pin 38 which is welded to the bracket 34. Each pin 38 has a pair of diametrically opposite protuberances 40 spaced inwardly from the outer end of the pin and having a purpose explained below. Each bracket 34 has an end portion 42 which is offset from the straight portion 36 and terminates in an end 44 bent at a right angle to the remainder of the portion 42. The offset portion is spaced from the panel 28 except that the end 44 is welded to the underside of the upper end 30 of the panel 28. In an area of the bracket 34 where the offset portion 42 joins the straight portion 36, an opening 46 is provided which appears in side view (FIG. 2) as an elongate hole but in top view (FIG. 4) as a diamond-shape due to opposite side portions 48 and 50 of the material forming the offset and bounding the opening being bent or offset relative to each other. The purpose of the opening 46 is described below.

The tailgate 26 is mounted to the remainder of the box 18 by structure including a mounting bracket 52 in the form of a rearwardly opening channel defining the rear end of each of the side walls 22 and having its web disposed vertically and joined to inner and outer flanges 54 and 56, respectively, with the outer flange extending rearwardly beyond the inner flange in increasing amounts from top to bottom. The oppositely projecting pins 38 of the tailgate 26 are pivotally received in holes 57 provided in the outer flanges 56 and cooperate therewith for defining a horizontal pivot axis about which the tailgate is swingable between its closed and open positions. The holes 57 are provided with diametrically opposite, vertically aligned clearance notches 58. The pin protuberances 40 are disposed 45° out of phase with the notches 58, the latter serving to permit the tailgate 26 to be disconnected from the brackets 52 by rotating the tailgate down 45° from its open position (permitted by first removing latch and support member 64 from bracket 52) and shifting it sideways so that the protuberances of the pin at one end of the tailgate pass through the notches 58 while the pin at the other end of the tailgate is withdrawn from the hole 57 of its mounting bracket 52. The tailgate 26 can then be cocked rearwardly and moved so as to first withdraw the protuberances 40 through the notches 58 and then the associated pin 38 from the hole 57.

For a purpose explained below, the flanges 56 of each bracket 52 is provided with a fore-and-aft elongated opening 59 at a location near the top of the bracket and next to the web. Spaced forwardly from the opening 59 in a rear edge portion of the flange 56 is a clearance notch or recess 60 which is located just beneath an out-turned wing 62 formed at the upper rear edge of the flange 56.

Acting together with and mounted between each of the sets of brackets 34 and 52 at the opposite sides of the box 18 for defining a combined latch and support structure for selectively retaining the tailgate in its closed position or supporting the tailgate in its open position is an elongate unitary latch and support member 64. Specifically, each member 64 comprises a formed resilient metal rod having a straight body section 66 having a length which is approximately equal to the distance between the openings 46 and 59, respectively in the tailgate and side wall brackets 34 and 52 when the tailgate 26 is in its open position (FIG. 2) wherein it forms a horizontal extension of the floor 20. A first hook or retaining portion 68 includes a backturned section 70 which parallels the body portion 66, the backturned section being joined to an end section 72 which is disposed at a right angle to the backturned section. The hook or retaining portion 68 extends through the opening 59 in the bracket 52 with the flange 56 then being between the sections 66 and 70. Joined to the opposite end of the straight section 66 is a second hook or retaining portion 74 which makes an acute angle with the section 68 and terminates in an out-turned end 76.

When the tailgate 26 is in its open position, as shown in FIG. 2, it can be seen that the latch and support member 64 supports the tailgate with the hook or retaining portion 76 embracing the formed end 30 of the tailgate. When it is desired to close the tailgate 26, the latter is lifted into abutting relationship with the rear ends of the side walls 22. The latch and support members 64 will then be in substantially horizontal, rearwardly projecting positions. The operator will then latch one then the other of the members 64 by grasping a ring-like handle 78 welded to the straight portion 66 at a location adjacent the second hook 74 and swinging the free end of the member 64 toward an inward location of the top end 30 of the tailgate and inserting the end 76 in a hole 80 provided there. It is to be understood that when the member 64 reaches the solid line position shown in FIG. 3 wherein it is just about to pass beneath the tailgate upper end 30, the straight portion 66 comes into contact with the edge of the opening 46 in the tailgate bracket 34. Further movement of the member 64 causes the latter to flex and be resiliently loaded. When the member 64 is released with the end 76 placed in the hole 80, some of the load remains so that the contact points of the member 64 with the tailgate and side wall brackets 34 and 52 remain tight while the tailgate 26 is biased towards its closed position. Thus, it will be appreciated that each latch and support member 64 works in a manner to reduce rattling of the member 64 and associated tailgate end during the operation of the vehicle 10 with the tailgate 26 in its closed position.

We claim:

1. In a cargo box having a floor, opposite side walls and a rear wall with the latter being defined by a tailgate which is mounted for pivoting about a horizontal axis, located adjacent the floor, between an upright closed position and a generally horizontal open position and the tailgate being releasably latched in its closed position by a structure acting between each end of the tailgate and an adjacent one of the opposite side walls, the improvement comprising: said structure including a first opening in an upper corner location of one end of the tailgate, as considered with the tailgate in its closed position; a second opening in an upper rear corner location of said adjacent one of the side walls; and a rigid, elongate latch and support member associated with each first and second opening at opposite sides of the box and having a relatively straight intermediate section slidably received in said first opening and terminating at one end in a first hook portion received and retained in said second opening and terminating at another end in a second hook portion having a shape which engages a rear edge of the tailgate when the latter is in its open position, whereby the elongate member supports an end of the tailgate when the latter is in its open position; and said tailgate including, as considered in its closed position, an upright panel having an upper end including a horizontal rearwardly extending portion joined to a vertical downwardly extending portion; a third opening located in the downwardly extending portion in any upper location spaced inwardly from each first opening; and said second hook portion of each elongate latch and support member including a rearwardly extending terminal end portion releasably received in an associated one of the third openings when said tailgate is in its closed position to thereby latch the tailgate in place.

2. The cargo box defined in claim 1 wherein opposite ends of said tailgate are defined by a mounting member in the form of a strap fixed to opposite ends of said panel, including the horizontal and vertical portions of the upper end of the panel; said latch and support member being resilient; and each second opening being located in a respective one of said mounting members and being bounded by portions which are non-coplanar with one of the latter portions serving as a fulcrum point about which said latch and support member is flexed when the terminal end portion thereof is received in an associated one of the third openings, whereby the tailgate will be tightly held in its closed position without any rattling of the latch and support members taking place.

3. The cargo box defined in claim 2 wherein said opposite side walls each have a rear end defined by an upright rearwardly opening channel member having an outer leg which is longer than an inner leg thereof; and an pin being supported by a lower portion of each of said mounting members and pivotally received in a lower location of the outer longer leg of a respective one of the channel members.

4. The cargo box defined in claim 3 wherein said latch and support member is a rod; and each first opening being located in an upper forward location of the outer leg of a respective channel member.

5. The cargo box defined in claim 3 wherein each pin is provided with a pair of diametrically opposite protuberances; said outer longer leg of each channel member being provided with a pair of diametrically opposite clearance notches at the pivotal mounting of an associated one of the pins; and said protuberances and clearance notches being so located relative to each other that the protuberances will become aligned with the clearance notches to permit the disconnection of the tailgate from the channel members only upon the tailgate being rotated downwardly beyond its open position.

* * * * *

UNITED STATES PATENT AND TRADEMARK OFFICE
CERTIFICATE OF CORRECTION

PATENT NO. : 5,280,986
DATED : January 25, 1994
INVENTOR(S) : Henry Friesen et al.

It is certified that error appears in the above-identified patent and that said Letters Patent is hereby corrected as shown below:

Column 4, line 23, delete "any" and insert --an--.

Column 4, line 49, delete "an" and insert --a--.

Signed and Sealed this

Thirtieth Day of August, 1994

Attest:

BRUCE LEHMAN

*Attesting Officer*      *Commissioner of Patents and Trademarks*